(Model.)

3 Sheets—Sheet 1.

J. STUART.
CHECK ROW CORN PLANTER.

No. 255,207.　　　　　　　Patented Mar. 21, 1882.

Witnesses:　　　　　　　　Inventor:
Wm Kegler　　　　　　　　John Stuart
Anton Vorusschenk (Model.)
3 Sheets—Sheet 2.
J. STUART.
CHECK ROW CORN PLANTER.
No. 255,207. Patented Mar. 21, 1882.
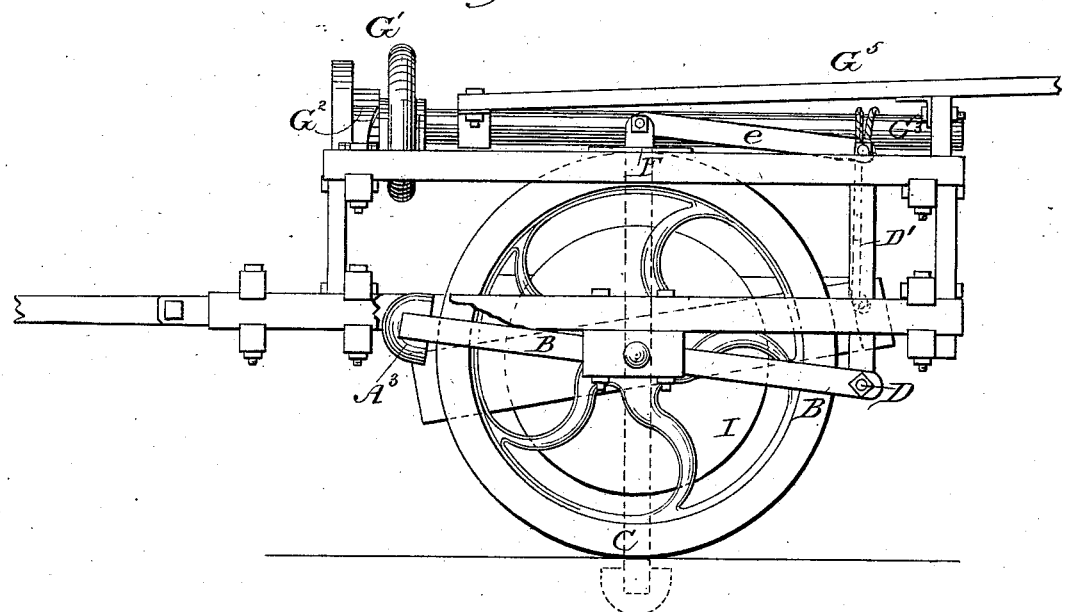
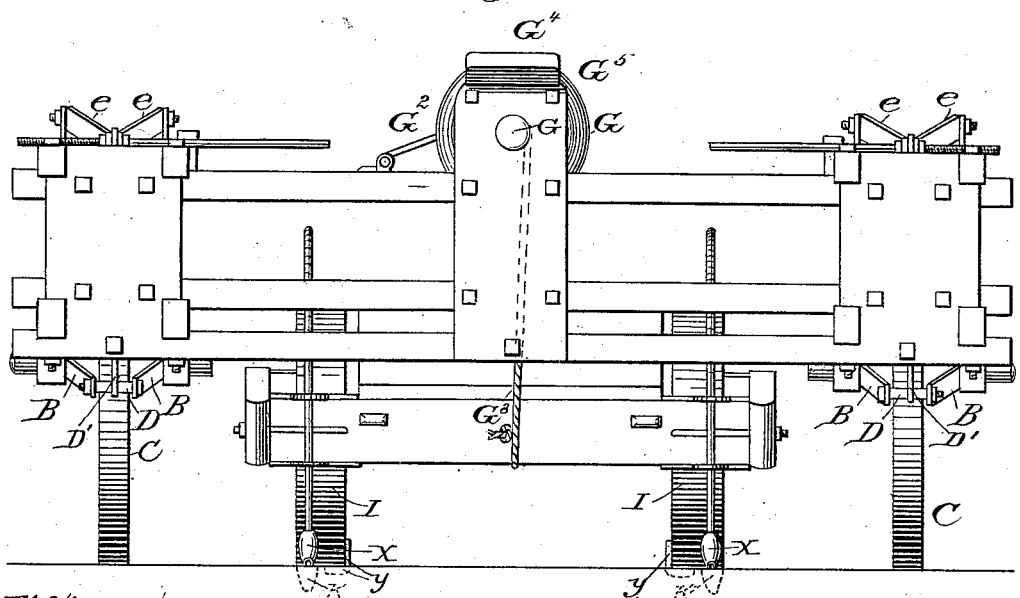
Witnesses:
Wm Keyler
Anton Winschenk
Inventor:
John Stuart (Model.)

3 Sheets—Sheet 3.

J. STUART.
CHECK ROW CORN PLANTER.

No. 255,207. Patented Mar. 21, 1882.

Witnesses:
Wm. Kegler
Anton Wünscheink

Inventor:
John Stuart

UNITED STATES PATENT OFFICE.

JOHN STUART, OF BELLEVUE, IOWA.

CHECK-ROW CORN-PLANTER.

SPECIFICATION forming part of Letters Patent No. 255,207, dated March 21, 1882.

Application filed March 26, 1881. (Model.)

*To all whom it may concern:*

Be it known that I, JOHN STUART, of Bellevue, Jackson county, State of Iowa, have invented new and useful Improvements in the Construction, Combination, and Operation of a Check-Row Corn-Planter, which improvements are fully set forth in the following specification and accompanying drawings.

Figure 1:
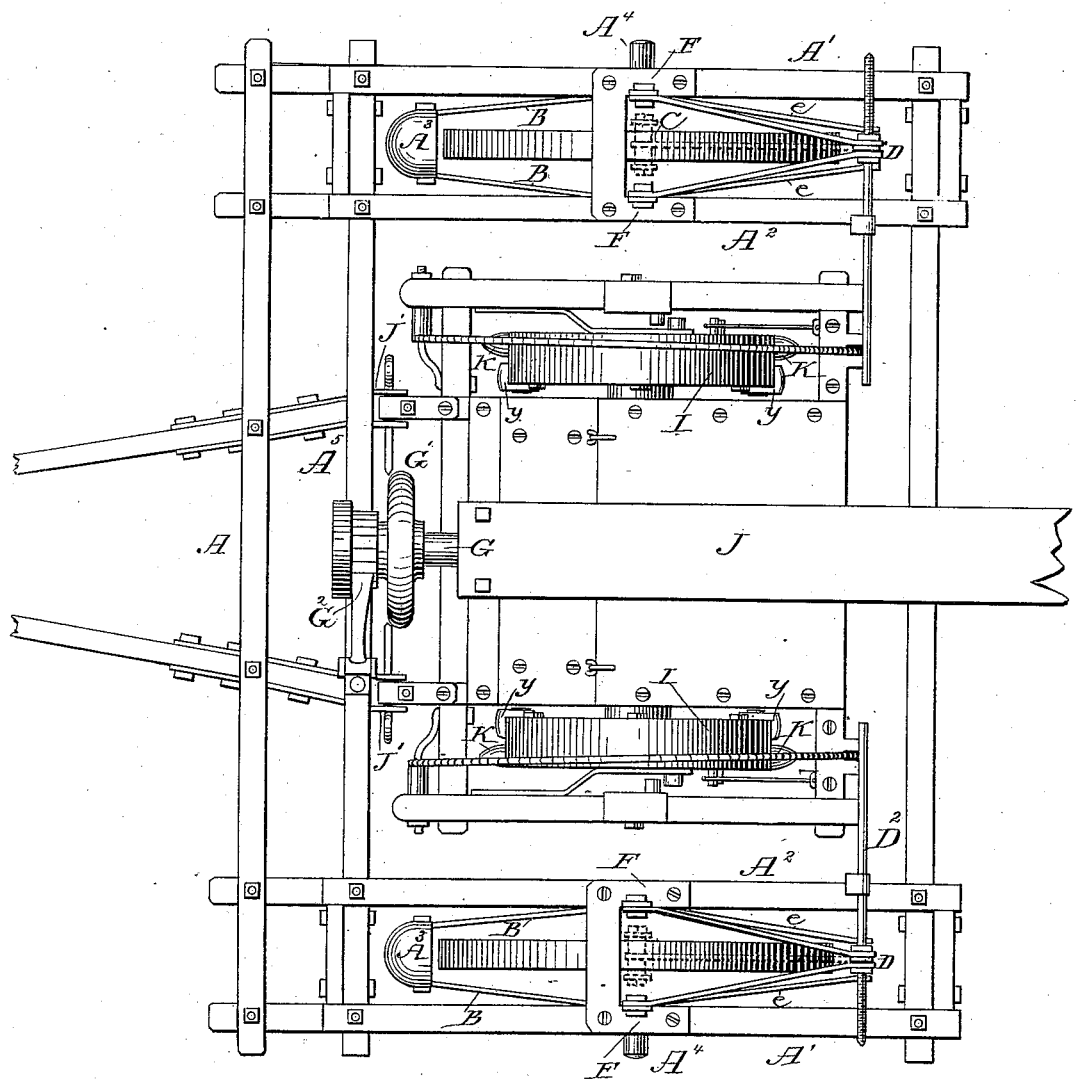
Figure 4:
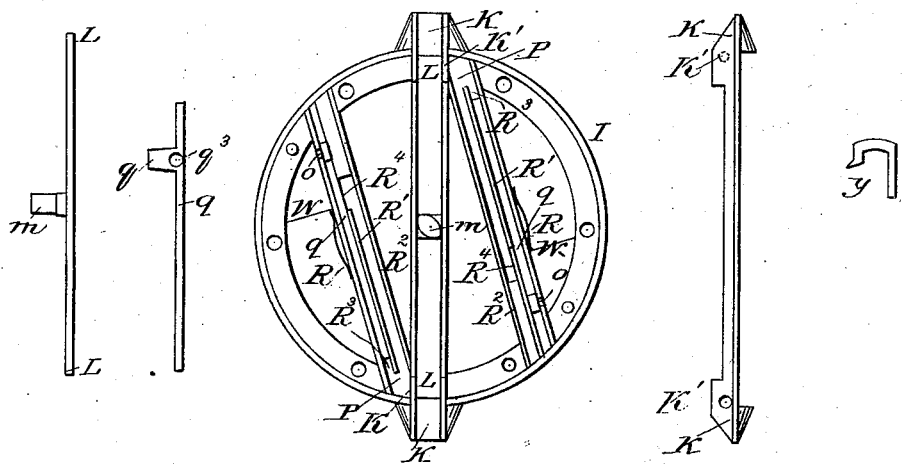
Figure 5:
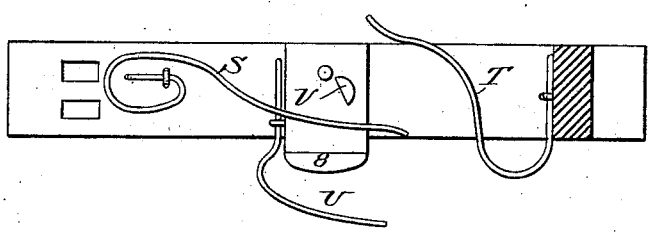
Figure 6:
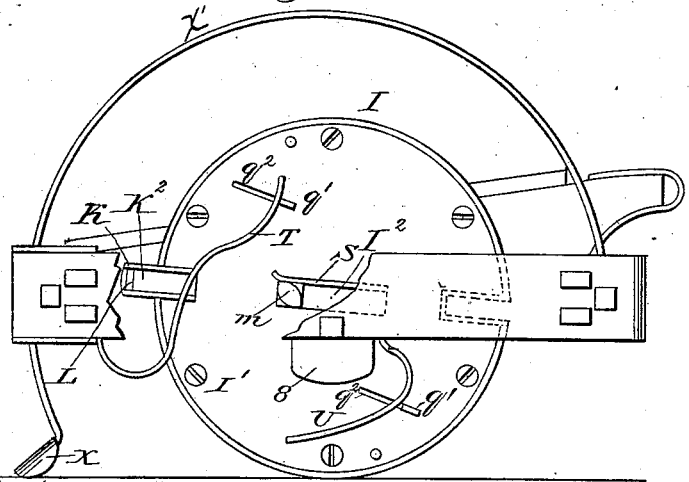

In the drawings, Figure 1 is a plan. Fig. 2 is a side elevation. Fig. 3 is a rear elevation. Fig. 4 shows the inner side of one of the dropping-wheels and the mechanism for dropping the seed. Fig. 5 is one of the side bars of the planter-frame, having the springs for operating the dropping devices; and Fig. 6 is a side elevation of one of the dropping-wheels.

The object of this invention is to furnish an improved machine for dropping seed in check-rows.

It consists in a movable pivot or fulcrum block supported on one end of a frame journaled on the spindle of the supporting-wheel, and the mechanism for throwing it under the wheel.

It consists, further, in the mechanism for dropping the seed, supported in the supplemental frame, all of which will be hereinafter fully explained.

A is the sulky-frame, made in rectangular form, and having the pairs of parallel end bars $A'$ $A^2$, between which the supporting-wheels C C are placed. The sulky-frame is constructed so that a space is provided between the inner bars, $A^2$, large enough in which to hang the supplemental frame.

G is a windlass placed on the sulky-frame, and midway between the wheels C C. It is provided with a suitable hand-wheel, $G'$, by which it may be turned, and it is held by a ratchet and pawl, $G^2$. The windlass is arranged to be under the control of the driver, and has one end of the rope $G^3$ fixed to it, the other end of the rope being made fast to the rear end of the supplemental frame.

$A^3$ is a movable pivot or fulcrum block, which is held on the ends of arms B B. The fulcrum is arranged in line with and so that it moves close to the tire of wheel C, and so that it may be turned under and lift the latter off the ground. The arms B B extend from the fulcrum inward and on opposite sides of the wheel, and are provided with bearings which fit over opposite ends of the spindle $A^4$. From their bearings on the spindle they extend to the opposite side of the wheel from the fulcrum, and are connected together by a pin, D. On the pin D one end of the pitman $D'$ is attached. The other end of the pitman extends vertically upward and is attached to the handle or rod $D^2$, arranged to be within easy reach of the driver on the seat $G^4$, secured to the bar $G^5$.

$e$ $e$ are arms, having one of their ends attached to the rod $D^2$, while their other ends are extended horizontally forward, and are pivoted on lugs F F, arranged vertically over the spindles $A^4$ of the wheels C. The pitman $D'$ and the arms $e$ $e$ are of the same length. By raising the arms $e$ to a vertical position the pitman will draw the arms B B also into a vertical position and throw the fulcrum $A^3$ under the wheel vertically below the spindle $A^4$. A reverse movement brings the arms B into the horizontal position shown in full lines, Figs. 1 and 2. When the arms B are raised to a vertical position and the fulcrum $A^3$ is firmly seated in the ground the rod $D^2$ may be thrown down to the frame, carrying with it the arms $e$ $e$, and the pitman will lie in the horizontal position shown in dotted lines, Fig. 1, and the arms B B will be securely locked.

J is the supplemental frame, on which the dropping-wheels I I are carried. The frame J is placed within the space included in frame A, and is coupled to the front cross-bar $A^5$, so that it swings vertically independently of the said frame.

I I are the planting-wheels, both similarly constructed and provided with axles extended from their inner sides and supported in bearings in the frame J. They are made of proper circumference, so that they drop two hills of grain by one revolution. I will describe the construction of one of these wheels. It is composed of a hollow casing having one of its sides, $I'$, removable. Within the wheel is placed the grain to be planted. Within the casing I place the diametrical chute or dropping-spout K, the ends of which project outward from the periphery of the wheel, and are open and adapted to be pressed into the ground, as the wheel revolves, and deposit the seed. At opposite ends of the chute K, and just inside the rim of the wheel, small side openings, K', are formed, through which the grain is received.

L is a vibrating plunger, placed in the chute. It is provided with a side lug, $m$, arranged at its middle and projected laterally through a slot, $I^2$, in the removable plate I'.

I also arrange within the wheel two lateral chutes, R R, set at an angle to the central chute, K, and arranged the one to connect at one end of the said central chute, and the other to connect at the opposite end thereof and cover the grain-openings K'. These lateral chutes are set at an angle to the central chute, and are divided by central partitions into two channels, $R^2 R^3$. The partition R' is made short enough to provide openings $R^4$ and P at its ends. In the channels $R^3$, I place shuttles $q$, which have lateral lugs $q'$, which project through slots $q^2$ in the face-plate I'. The shuttles are provided with gage-holes $q^3$, which receive grain through the side openings, $o$, in the chutes R. The shuttles take the grain from the openings $o$ and convey it to the openings $R^4$ and discharge it into the channels $R^2$. At the same time the lower end of the shuttle descends to the rim of the wheel and partially closes the space P and makes a direct passage for the grain from the channel $R^2$ to the openings K'. The plunger and shuttles are operated by springs S T U, fixed to the framing and arranged to bear on the lugs $m$ and $q'$ as the wheel revolves. The spring S acts and gives a quick motion to the plunger. The plunger is held by a cam, V, on the frame, and is prevented thereby from being moved by the spring S until the open end of the spout K reaches the proper place in which to deposit the grain. The shuttle is moved in one direction by the spring T and in the opposite direction by the spring U.

$y y$ are the markers, fixed on the periphery of the wheel, and $x x$ are the coverers, arranged in rear of said wheels. The coverers are attached to the ends of the rods $x' x'$, which are bent in a circular form and carried over the top of the dropping-wheels to the front of the frame J, where they are made fast by pivotal connections.

W W are inclines arranged in the wheel, and are intended to conduct the grain to the opening $o$.

8 8 are fenders or guards.

By the windlass G the supplemental frame and the dropping mechanism can be raised or lowered at pleasure.

The operation of the machine will be clearly understood by reference to the drawings, and the foregoing description of the construction of the several parts.

Having thus described my invention, what I claim, and desire to secure by Letters Patent, is—

1. The combination, with the frame A and the wheels C, of the fulcrum-block $A^3$, frames or arms B, carrying the fulcrum-block $A^3$ and pivoted on the axles of the wheels, the bar D', and levers $e$, pivoted to the frame A and to the bar D', and operating substantially as and for the purposes set forth.

2. The combination, substantially as set forth, of the hollow dropping wheel I, having the chute K open at both ends and arranged diametrically across it, the plunger L, provided with the lug $m$ projected through the face-plate, the cam V, and the spring S, substantially as set forth.

3. The combination, with the hollow dropping-wheel, of the diametrical chute K, the lateral chutes R R, connected at the opposite ends of the chute K, and divided into two channels by central partitions, the plunger L, and shuttle $q q$, substantially as set forth.

JOHN STUART.

Witnesses:
WM. KEGLER,
A. WEINSCHENK.